(12) United States Patent
Lee

(10) Patent No.: US 11,553,776 B2
(45) Date of Patent: Jan. 17, 2023

(54) COMPACT CONTAINER HAVING CONTAMINATION-PREVENTING COOLING PLATE

(71) Applicant: PUM-TECH KOREA CO., LTD, Incheon (KR)

(72) Inventor: Do Hoon Lee, Incheon (KR)

(73) Assignee: PUM-TECH KOREA CO., LTD, Incheon (KR)

( * ) Notice: Subject to any disclaimer, the term of this patent is extended or adjusted under 35 U.S.C. 154(b) by 416 days.

(21) Appl. No.: 16/622,240

(22) PCT Filed: May 3, 2019

(86) PCT No.: PCT/KR2019/005380
§ 371 (c)(1),
(2) Date: Dec. 12, 2019

(87) PCT Pub. No.: WO2019/231123
PCT Pub. Date: Dec. 5, 2019

(65) Prior Publication Data
US 2020/0196731 A1    Jun. 25, 2020

(30) Foreign Application Priority Data
May 29, 2018 (KR) .......................... 10-2018-0061201

(51) Int. Cl.
*A45D 33/02* (2006.01)
*A45D 33/00* (2006.01)

(52) U.S. Cl.
CPC ......... *A45D 33/025* (2013.01); *A45D 33/003* (2013.01)

(58) Field of Classification Search
CPC .... A45D 33/025; A45D 33/003; A45D 33/02; A45D 33/006; A45D 33/008;
(Continued)

(56) References Cited

U.S. PATENT DOCUMENTS

2016/0242529 A1* 8/2016 Oh ........................ A45D 33/008

FOREIGN PATENT DOCUMENTS

| KR | 10-2018-0004408 A | 1/2015 |
| KR | 10-2018-0014418 A | 2/2015 |

(Continued)

*Primary Examiner* — Edward Moran
*Assistant Examiner* — Luis M Ruiz Martin
(74) *Attorney, Agent, or Firm* — Lucem, PC; Heedong Chae

(57) ABSTRACT

A compact container having a contamination-preventing cooling plate, includes: a discharge mechanism, inside the compact container, for discharging cosmetics; a discharge plate having a discharge hole and a coupling groove formed in the center thereof; and the cooling plate, which is coupled to the upper part of the discharge plate, has an outlet formed in the center thereof, and is made from a metal material. A contamination guard plate is coupled to the coupling groove of the discharge plate so as to block most of the outlet of the cooling plate while leaving only a discharge gap. The contamination guard plate blocks the outlet of the cooling plate, excluding the discharge gap, so as to prevent bacteria or contaminants from entering the outlet from the puff, and the cooling plate, which is made from the metal material, lowers the temperature of the discharged cosmetics.

11 Claims, 8 Drawing Sheets

(58) Field of Classification Search
CPC ............... A45D 33/16; A45D 40/0075; A45D 2200/056; A45D 2200/054; B05B 11/30; B05B 11/3001; B05B 11/3004; B05B 11/3015; B05B 11/3016; B05B 11/3021; B05B 11/3022; B05B 11/3023; B05B 11/3025; B05B 11/3042; B05B 11/3043; B05B 11/3045; B05B 11/3046; B05B 11/3047; B05B 11/3088; B05B 11/0005; B05B 11/0037; B05B 11/0038
USPC .................... 132/298, 299; 298/306; 307/293
See application file for complete search history.

(56) References Cited

FOREIGN PATENT DOCUMENTS

| | | | | |
|---|---|---|---|---|
| KR | 10-2015-0096603 A | | 8/2015 | |
| KR | 20160002661 | * | 8/2016 | ............. A45D 40/24 |
| KR | 10-2016-0132217 A | | 11/2016 | |
| KR | 10-2017-0114004 A | | 10/2017 | |
| KR | 20-2017-0003816 U | | 11/2017 | |
| WO | WO-2016047941 A1 | * | 3/2016 | ............. A45D 40/00 |

\* cited by examiner

— Prior Art —

— Prior Art —

COMPACT CONTAINER HAVING CONTAMINATION-PREVENTING COOLING PLATE

TECHNICAL FIELD

The present invention relates to a compact container having a contamination-preventing cooling plate, and more particularly, to a compact container having a contamination-preventing cooling plate which includes, a discharge device for discharging cosmetics in the compact container, a discharge plate having a discharge hole and a coupling groove formed at a center thereof, and a cooling plate coupled to an upper portion of the discharge plate and having an outlet formed at a center thereof of a metal material, where a contamination guard plate is coupled to a coupling groove of the discharge plate to block most of the outlet of the cooling plate except for only a discharge gap. Accordingly, when the user presses the cooling plate with a puff, the contamination guard plate blocks the outlet of the cooling plate except for the discharge gap, thereby preventing bacteria or contaminants from entering the outlet. In addition, the cooling plate made of metal lowers the temperature of the discharged cosmetics to provide a cooling effect when the cosmetics are applied to the skin, thereby improving user satisfaction.

BACKGROUND ART

In general, women use powder or gel-type foundation to express their skin color beautifully, to hide skin defects and to protect the skin from dust and ultraviolet rays.

The powder has a disadvantage in that the contents are scattered during use and the adhesion is reduced when applied to the face, so that the frequency of use of the gel-type foundation has increased.

Accordingly, a compact container for storing and carrying a gel-type foundation has been developed, which is intended to contain cosmetics in the container, or to embed an impregnation member impregnated with the cosmetics, so that the cosmetics are used by sticking directly the cosmetics or the impregnated member with a puff.

However, according to a conventional compact container, when the user presses the cosmetics or the impregnation member impregnated with cosmetics by using a puff, the cosmetics are stuck to the puff more than necessary due to the pressure, so that cosmetics may be wasted.

In addition, the cosmetics are stuck to the puff by directly pressing the impregnation member impregnated with the cosmetics and are applied on the skin to apply makeup and the impregnation member is repeatedly pressed with the puff, so that the impregnation member and the cosmetics impregnated in the impregnation member may be contaminated due to sweat, keratin, foreign substances, bacteria, etc. present on the skin.

To solve the above problems, as shown in FIG. 1, there has been disclosed a compact container in Korean Unexamined Utility Model Publication No. 20-2017-0003816, where the compact container includes a discharge device for discharging cosmetics, a discharge plate provided on one side of which the cosmetics are discharged from the discharge device and having a plurality of outlets, and a diffusion plate provided between the discharge device and the discharge plate to diffuse the cosmetics discharged from the discharge device, so that the cosmetics are prevented from being contaminated by discharging the cosmetics in a certain amount and preventing the puff from making direct contact with the cosmetics.

However, the conventional compact container is kept in a place such as a handbag or a bag when carrying. In this case, as the heat of the keeping place is transmitted to the cosmetic container, the temperature of the cosmetics contained in the container also increases, so that the using texture is deteriorated when the cosmetics are applied to the skin.

To solve the above problems, as shown in FIG. 2, there has been disclosed a compact container in Korean Unexamined Patent Publication No. 10-2015-0098803, where the compact container includes a discharge device for discharging cosmetics, a discharge plate provided on one side of the cosmetic means through which cosmetics are discharged from the discharge device and formed of a metal material with a plurality of outlets, and a diffusion plate provided between the discharge device and the discharge plate to diffuse the cosmetics discharged from the discharge device. Therefore, the cosmetics discharged may be cooled on the metal discharge plate to provide a cold feeling to the skin of the user applying the cosmetics.

However, according to the conventional compact container, since the cosmetics discharged from the plurality of outlets must be stuck on a puff while pressing the discharge plate several times with the puff in order to apply cosmetics, the contaminants stuck on the puff are left in the cosmetics at the plurality of outlets, so that the cosmetics remaining in the outlets are contaminated, and the cosmetics contaminated at the outlets contaminate the cosmetics in the diffusion space under the discharge plate connected to the outlets, thereby causing skin troubles.

In addition, when the cosmetics are kept after use, the cosmetics remaining in the outlet are hardened so that the outlet is clogged.

In addition, when the discharge plate gets dirty due to long term use is washed with water or a wet tissue paper, water enters the diffusion space through the outlets, which causes the remaining cosmetics in the diffusion space to become thinner and unusable, or to decay and cause skin troubles.

DISCLOSURE

Technical Problem

To solve the problems described above, one object of the present invention is to provide a compact container having a contamination-preventing cooling plate which includes a discharge device for discharging cosmetics in the compact container, a discharge plate having a discharge hole and a coupling groove formed at a center thereof, and a cooling plate coupled to an upper portion of the discharge plate and having an outlet formed at a center thereof of a metal material, where a contamination guard plate is coupled to a coupling groove of the discharge plate to block most of the outlet of the cooling plate except for only a discharge gap. Accordingly, when the user presses the cooling plate with a puff, the contamination guard plate blocks the outlet of the cooling plate except for the discharge gap, thereby preventing bacteria or contaminants from entering the outlet. In addition, the cooling plate made of metal lowers the temperature of the discharged cosmetics to provide a cooling effect when the cosmetics are applied to the skin, thereby improving user satisfaction.

Another object of the present invention is to provide a compact container having a contamination-preventing cooling plate, which is capable of keeping the cooling plate clean at all times by obliquely tilting the compact container after the use of the cosmetics and spraying water to clean the contaminated cooling plate. In addition, as the cooling plate is washed while the drainage gap is cleaned, the cosmetics remaining in the discharge gap are also washed to prevent the discharge gaps from being contaminated and the cosmetics from being hardened between the discharge gaps.

Still another object of the present invention is to provide a compact container having a contamination-preventing cooling plate, in which a discharge passage is formed between the discharge plate and the discharge device. When the user tilts the compact container and sprays water to clean the cooling plate after the use of the cosmetics, the water flows into the discharge passage through the discharge gap in a tilted upper portion. The flowing water washes the discharge passage, washes off the cosmetics remaining in the discharge passage, and then discharges it to a lower portion of the tilted discharge gap, thereby preventing the discharge gaps from being contaminated and the cosmetics from being hardened between the discharge gaps.

Still another object of the present invention is to provide a compact container having a contamination-preventing cooling plate, in which a contamination guard plate is formed by the addition of silver nano-material, so that the discharge gap in contact with an outside has antibacterial force to prevent the growth of bacteria. In addition, by disinfecting the cosmetics discharged to prevent the growth of bacteria in the cosmetics, the user may always use clean cosmetics.

Technical Solution

According to an aspect of the present invention, there is provided a compact container having a contamination-preventing cooling plate, which includes a discharge device for discharging cosmetics; a discharge plate coupled to the discharge device and formed with a discharge hole and a coupling groove at a center thereof; and a cooling plate coupled to the discharge plate and formed with an outlet at a center thereof and formed of a metal material, wherein a contamination guard plate is coupled into the coupling groove of the discharge plate to form a discharge gap between the contamination guard plate and the cooling plate.

The discharge device may include a pump for discharging the cosmetics through pumping.

A discharge passage through which the cosmetics pass may be formed between the discharge plate and the discharge device.

When wash liquid is sprayed to wash the cooling plate after obliquely tilting the compact container, the wash liquid may flow into a discharge passage through an upper portion of the discharge gap tilted, and the wash liquid flowing along the discharge passage may wash the cosmetics remaining in the discharge passage and is discharged back to a low portion of the discharge gap tilted.

An upper coupling ring may be further coupled to upper portions of the discharge plate and the cooling plate.

The cooling plate may be coupled between the discharge plate and the upper coupling ring, and a gap between the cooling plate and the upper coupling ring may be 0.05 mm or less.

An upper coupling ring may be formed at upper portions of the discharge plate and the cooling plate through insert-injection molding or double-injection molding.

A coupling protrusion may be formed below the contamination guard plate, and the coupling protrusion may pass through the coupling groove of the discharge plate and be fixedly coupled to the discharge device.

The contamination guard plate may be formed of a metal material or synthetic resin material.

The contamination guard plate may be formed through coating, plating or vapor deposition.

A width of the discharge gap may be 0.05 mm to 0.5 mm.

Advantageous Effects

According to the present invention, the compact container having a contamination-preventing cooling plate includes a discharge device for discharging cosmetics in the compact container, a discharge plate having a discharge hole and a coupling groove formed at a center thereof, and a cooling plate coupled to an upper portion of the discharge plate and having an outlet foamed at a center thereof of a metal material, where a contamination guard plate is coupled to a coupling groove of the discharge plate to block most of the outlet of the cooling plate except for only a discharge gap. Accordingly, when the user presses the cooling plate with a puff, the contamination guard plate blocks the outlet of the cooling plate except for the discharge gap, thereby preventing bacteria or contaminants from entering the outlet. In addition, the cooling plate made of metal lowers the temperature of the discharged cosmetics to provide a cooling effect when the cosmetics are applied to the skin, thereby improving user satisfaction.

In addition, according to the compact container having a contamination-preventing cooling plate of the present invention, the cooling plate may be kept to be clean at all times by obliquely tilting the compact container after the use of the cosmetics and spraying water to clean the contaminated cooling plate. In addition, as the cooling plate is washed while the drainage gap is cleaned, the cosmetics remaining in the discharge gap are also washed to prevent the discharge gaps from being contaminated and the cosmetics from being hardened between the discharge gaps.

In addition, according to the compact container having a contamination-preventing cooling plate of the present invention, the discharge passage is formed between the discharge plate and the discharge device. When the user tilts the compact container and sprays water to clean the cooling plate after the use of the cosmetics, the water flows into the discharge passage through the discharge gap in a tilted upper portion. The flowing water washes the discharge passage, washes off the cosmetics remaining in the discharge passage, and then discharges it to a lower portion of the tilted discharge gap, thereby preventing the discharge gaps from being contaminated and the cosmetics from being hardened between the discharge gaps.

In addition, according to the compact container having a contamination-preventing cooling plate of the present invention, the contamination guard plate is formed by the addition of silver nano-material, so that the discharge gap in contact with an outside has antibacterial force to prevent the growth of bacteria. In addition, by disinfecting the cosmetics discharged to prevent the growth of bacteria in the cosmetics, the user may always use clean cosmetics.

BEST MODE

Mode for Invention

The technical object achieved by the present invention and the embodiments of the present invention will be apparent from the preferable embodiments described below. Hereinafter, a compact container having a contamination-preventing cooling plate according to an embodiment of the present invention will be described in detail with reference to accompanying drawings.

Figure 1:
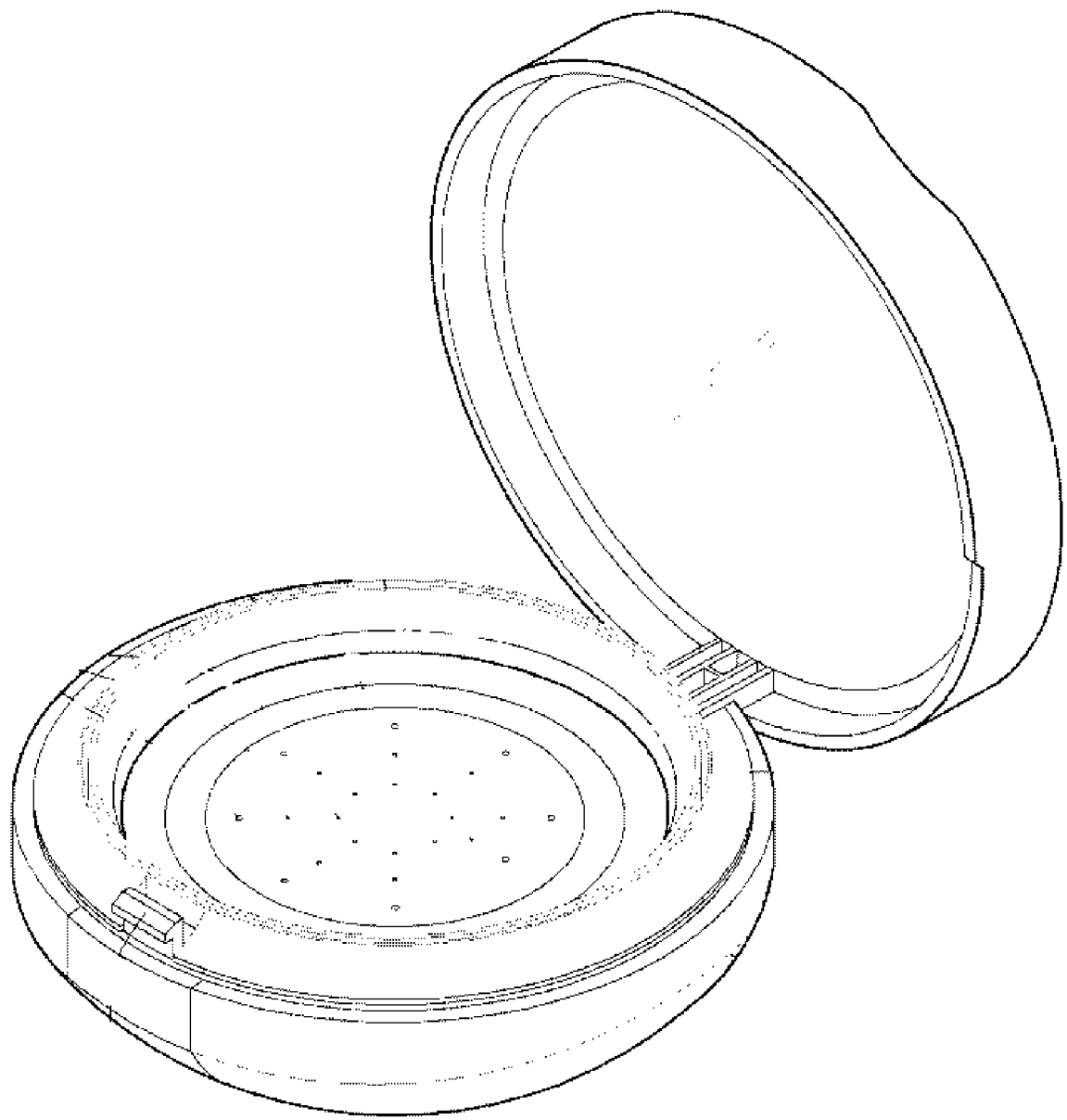
FIG. 1 is a view of a cosmetic container having a diffusion plate according to the related art.
Figure 2:
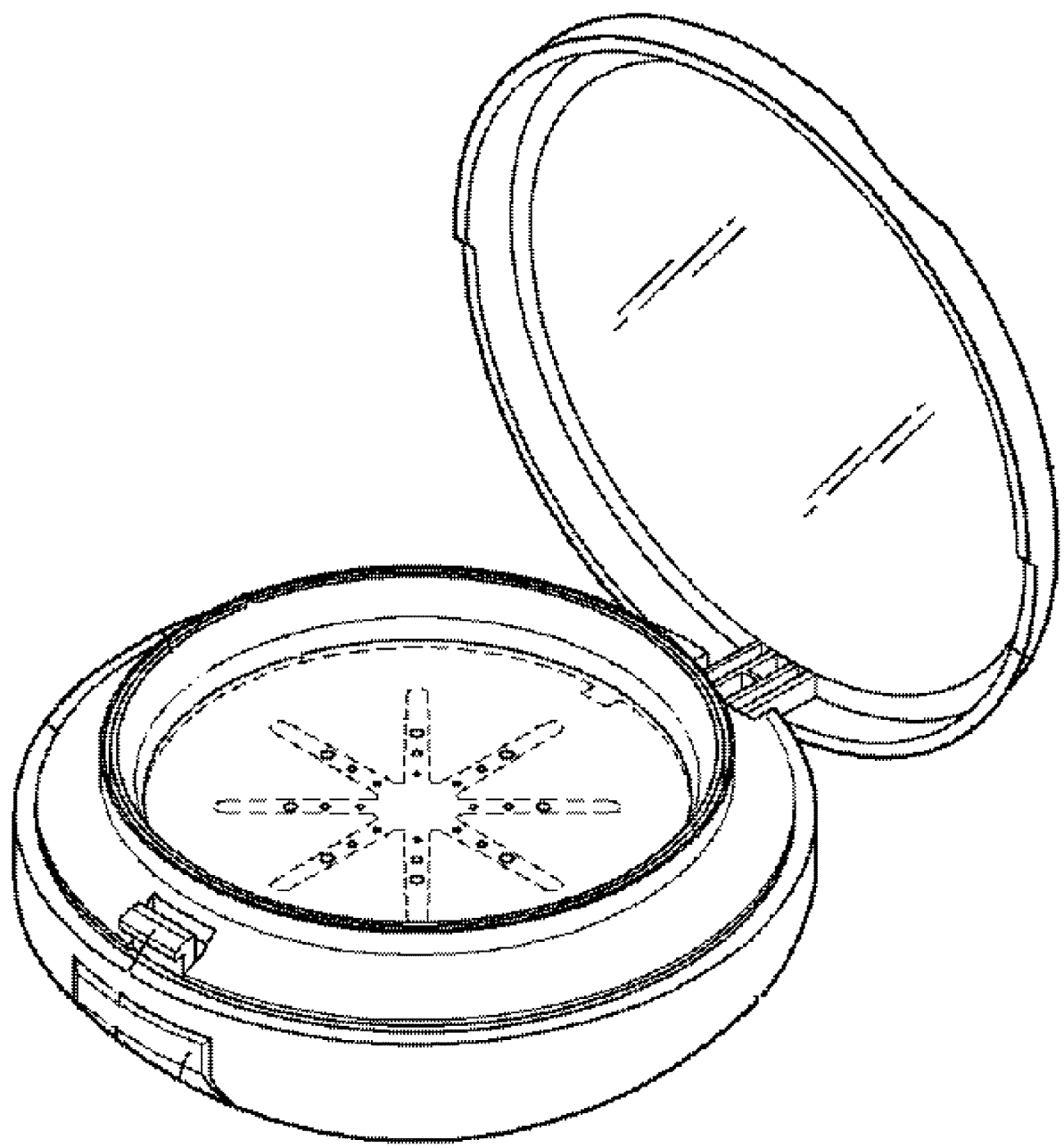
FIG. 2 is a view of a cosmetic container having a metal discharge plate according to the related art.
Figure 3:
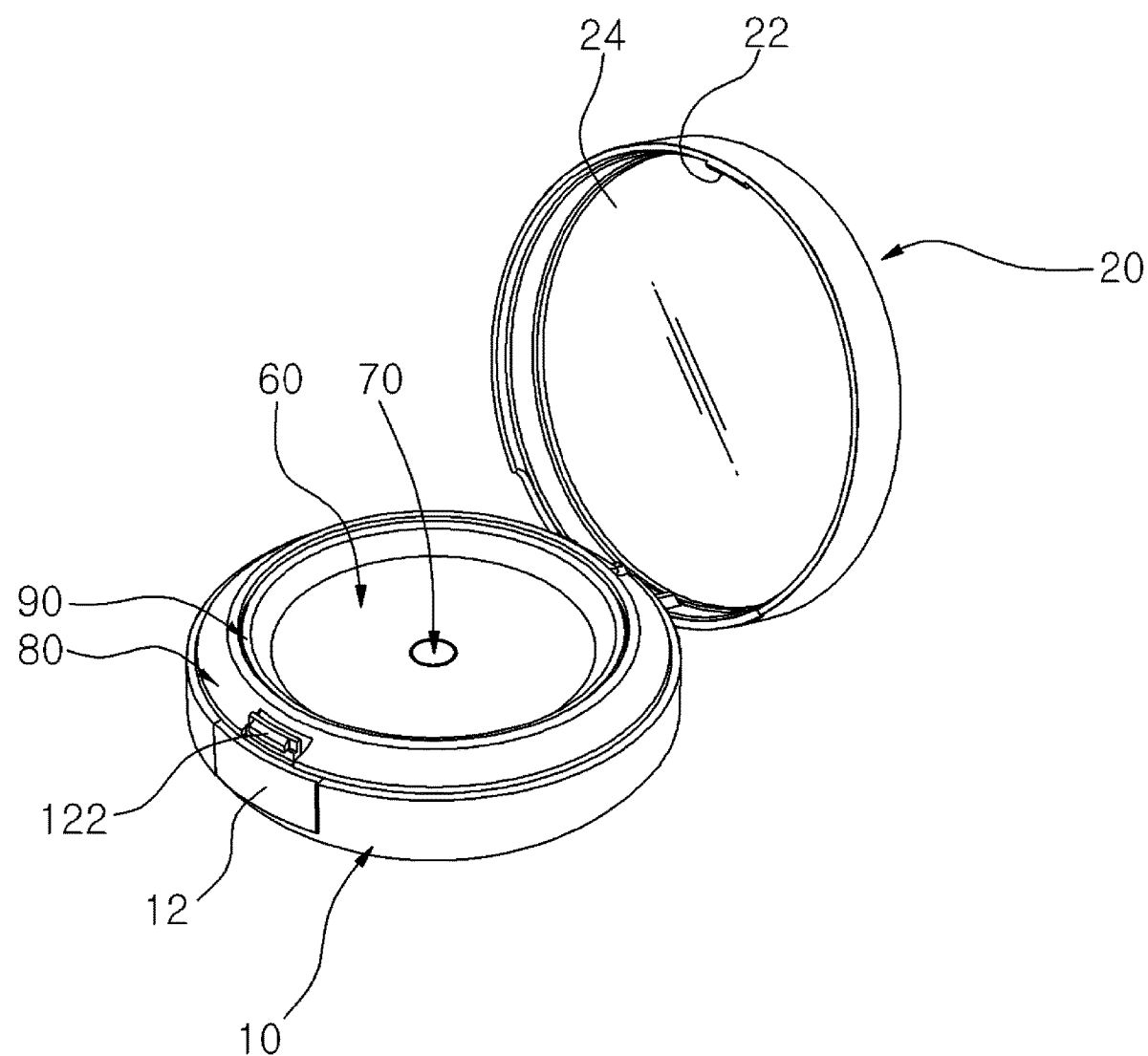
FIG. 3 is a perspective view of a compact container according to an embodiment of the present invention.
Figure 4:
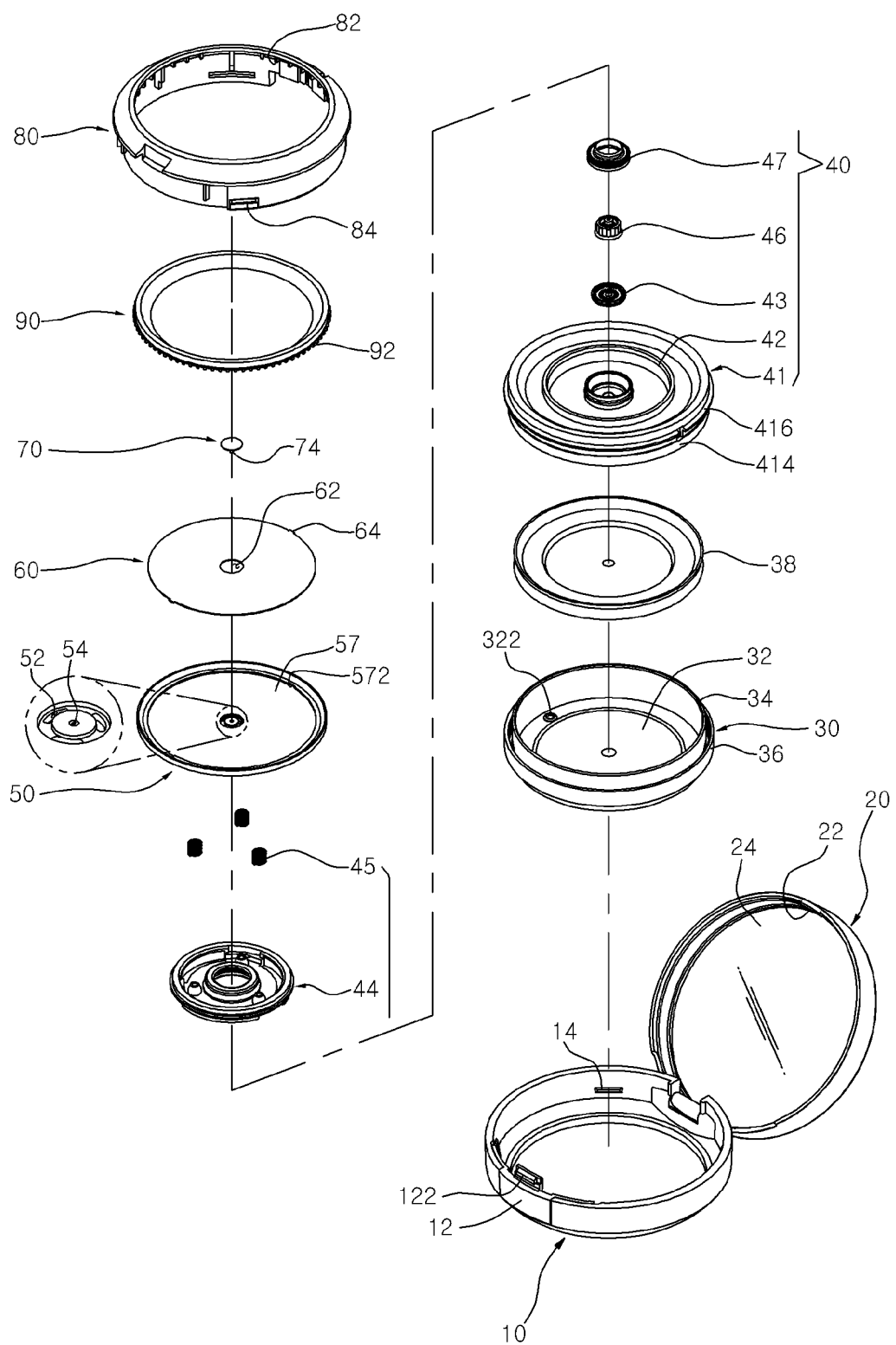
FIG. 4 is an exploded perspective view of a compact container according to an embodiment of the present invention.
Figure 5:
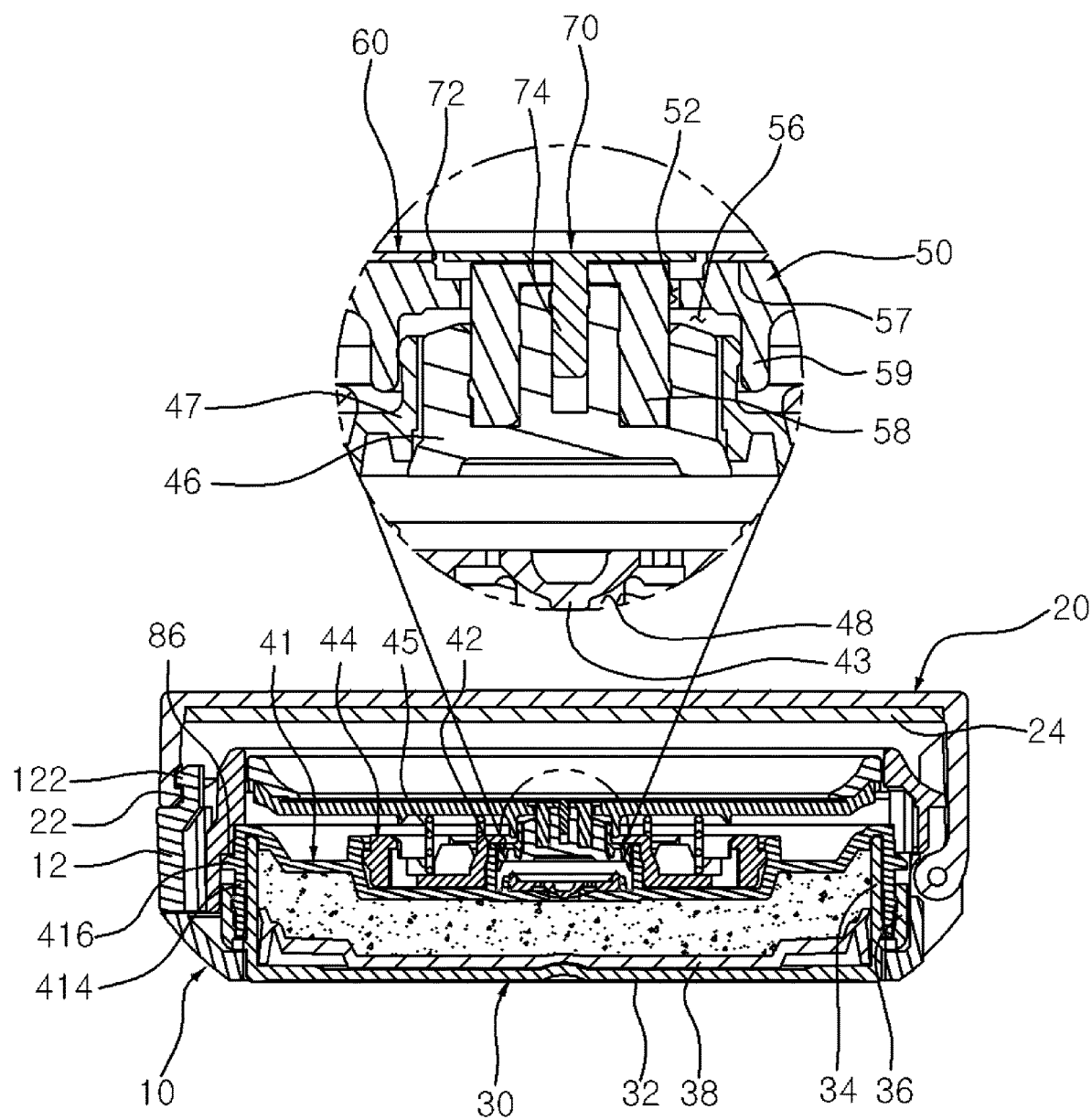
FIG. 5 is a cross-sectional view of a compact container according to an embodiment of the present invention.

FIG. 3 is a perspective view of a compact container according to an embodiment of the present invention. FIG. 4 is an exploded perspective view of a compact container according to an embodiment of the present invention. FIG. 5 is a cross-sectional view of a compact container according to an embodiment of the present invention.

A compact container having a contamination-preventing cooling plate according to the present invention includes a discharge device 40 for discharging cosmetics, a discharge plate 50 coupled to the discharge device 40 and formed with a discharge hole 52 and a coupling groove 54 at the center thereof, and a cooling plate 60 coupled to the discharge plate 50 and formed with an outlet 62 at the center thereof and of a metal material, where a contamination guard plate 70 is coupled into the coupling groove 54 of the discharge plate 50 to form a discharge gap 72 between the contamination guard plate 70 and the cooling plate 60.

As shown in FIG. 5, the discharge device 40 is formed in an upper portion of a content container 30. The content container 30 is mounted inside an outer container 10. An outer container lid 20 for opening and closing the outer container 10 is coupled to one side of the outer container 10.

A button 12 is formed on a front surface of the outer container 10, and a locking protrusion 122 that is retracted by a user's pressing operation is protruded from an upper portion of the button 12.

A coupling shoulder 80 is coupled to an inside of the outer container 10. The coupling shoulder 80 presses a pump housing 41 of the discharge device 40 to fix the pump housing 41 and the content container 30 to the inside of the outer container 10. At the same time, the discharge plate 50 can move vertically without tilting to one side when the discharge plate 50 moves up and down on the discharge device 40.

A pressure jaw 86 is formed at the inner circumference of the coupling shoulder 80 to press and fix the pump housing 41 of the discharge device 40.

A coupling protrusion 14 is formed on the inner circumference of the outer container 10, and a coupling groove is formed on the outer circumference of the coupling shoulder 80 such that they are coupled to each other.

The outer container lid 20 is hinge-coupled to one side of the outer container 10 to open and close the outer container 10.

The front surface of the outer container lid 20 is formed with a protrusion-shaped hook 22 to be fastened to the locking protrusion 122 of the outer container 10. In addition, a mirror 24 may be formed on the inner surface of the outer container lid 20 such that the user may easily apply makeup while mirroring the makeup part.

Cosmetics are contained in the content container 30, and the content container 30 is mounted inside the outer container 10, so that the content container 30 is fixed to the inside of the outer container together with the pump housing 41 while being pressed by the coupling shoulder 80.

The content container 30 includes a bottom surface 32, an inner wall 34 extending upwardly from the bottom surface 32, and an outer wall 36 extending upwardly spaced apart from the inner wall 34 by an interval.

At one side of the bottom surface 32 of the contents container 30, an air flowing hole 322 into which outside air is introduced is formed.

The inner side of the contents container 30 is formed with a pressing plate 38 for pushing up the cosmetics while moving upward by the amount of the discharged cosmetics, and the pressing plate 38 is tightly close to the inner surface of the content container 30.

The discharge device 40 is installed on an upper portion of the contents container 30 to discharge the cosmetics contained in the content container 30 by the pressing operation of the discharge plate 50. As shown in FIG. 5, at least a portion of the discharge device 40 may be inserted into the content container 30.

The discharge device 40 may be a pump for discharging the cosmetics contained in the content container 30 to an outside through pumping.

The discharge device 40 may include a pump housing 41 coupled to the upper portion of the content container 30, a cylinder 42 formed at the center of the pump housing 41 and having a content suction hole 48 formed on a bottom thereof, a suction valve plate 43 mounted on a bottom surface of the cylinder 42 to selectively open and close the content suction hole 48, a bushing 44 is mounted on an upper end of the cylinder 42 and coupled to an outside of the cylinder 42, an elastic member 45 installed in the bushing 44 to elastically support the discharge plate 50, a piston 46 coupled to a lower side of the discharge plate 50 and moved up and down inside the cylinder 42, and a piston ring 47 fitted to an outside of the piston 46 and tightly close to an inner surface of the cylinder 42.

The pump housing 41 is coupled to an upper portion of the content container 30 to seal the content container 30. A lower extension protrusion wheel 414 extends downward from an outside of the pump housing 41 and is coupled between the inner wall 34 and the outer wall 36 of the content container 30. A fixed protrusion wheel 416 which is pressed by a pressing sill 86 of the coupling shoulder 80 protrudes from an outer periphery of the lower extension protrusion wheel 414.

The discharge plate 50 is coupled to one side of the discharge device 40 through which the cosmetics are discharged, and discharges the cosmetics to an outside.

As shown in FIG. 4, an outlet 52 for discharging cosmetics is formed in a central portion of the discharge plate 50, and a coupling groove 54 to which the contamination guard plate 70 is coupled is formed inside the outlet 52. The outlet 52 may be partially formed on an outside of the coupling groove 54. Of course, the number and size of the outlet 52 may be variously changed depending on the state of the cosmetics used, the purpose and method of use, and the like.

Figure 6:
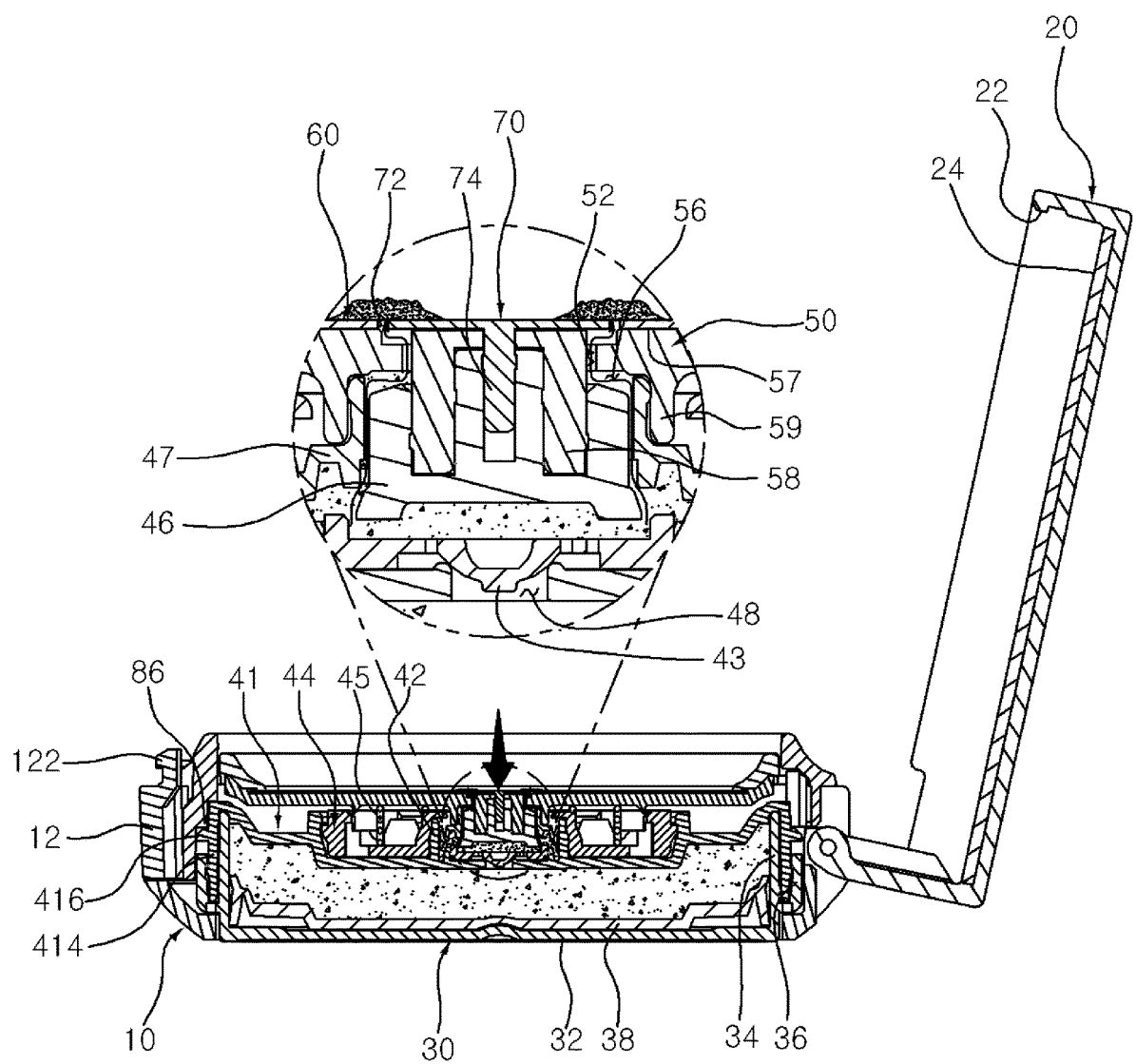
FIG. 6 is a cross-sectional view showing a state in which the cosmetics of a compact container according to an embodiment of the present invention are discharged to an outside.

As shown in FIG. 6, a discharge passage 56 through which the cosmetics pass is formed between the discharge plate 50 and the discharge device 40. In other words, the discharge passage 56 serves as a flow path for moving the cosmetics discharged through the discharge device 40 to the outlet 52 of the discharge plate 50 and the discharge gap 72 of the contamination guard plate 70.

A cooling plate seating surface 57 is formed on the upper surface of the discharge plate 50 so that the cooling plate 60 is seated. A cooling plate anti-rotation groove 572 is formed on an edge of the cooling plate seating surface 57, and the cooling plate anti-rotation groove 572 prevent the cooling plate 60 from being arbitrarily rotated on the discharge plate 50 when a user presses the cooling plate 60.

As shown in FIG. 5, the first lower extension protrusion wheel 58 extends downward on the lower surface of the discharge plate 50, and the second lower extension protrusion wheel 59 extends downward while being spaced apart outwardly from the first lower extension protrusion wheel 58 by a predetermined interval. The first lower extension protrusion wheel 58 is formed outside the coupling groove 54 and is coupled to the upper portion of the piston 46 of the discharge device 40. In addition, the second lower extension wheel 59 is tightly close to the upper outside of the piston ring 70 of the discharge device 40.

The cooling plate 60 is seated on the cooling plate seating surface 57 of the discharge plate 50 and exposed to the outside. The cooling plate 60 is formed of a metal material. In detail, the compact container is generally kept in a handbag or a bag when carrying. In this case, as the heat of the storage place is transmitted to the cosmetic container, the temperature of the cosmetics contained in the container is also increased, so that the using texture is deteriorated when the cosmetics are applied to the skin. Accordingly, by forming the cooling plate 60 made of metal on the upper surface of the discharge plate, the cosmetics discharged to the outside through the discharge device 40 are cooled by the cooling plate 60 of the metal material, so that the cosmetics provides a cool feeling to the user skin, that is, gives a cooling effect to the skin when the user wears makeup.

The outlet 62 is formed in the center of the cooling plate 60, the anti-rotation protrusion 64 is formed on the edge of the cooling plate 60. The anti-rotation protrusion 64 is inserted into the cooling plate anti-rotation groove 572 of the discharge plate 50 to prevent the cooling plate 60 from spinning when the discharge plate 50 and the cooling plate 60 are assembled.

An upper coupling ring 90 is further coupled to the upper portions of the discharge plate 50 and the cooling plate 60. The upper ring 90 is coupled while surrounding an edge portion of the cooling plate 60 and an upper portion the discharge plate 50.

As shown in FIG. 4, the upper coupling ring 90 has a plurality of first anti-rotation protrusions 92 formed on an outer circumference thereof, and a plurality of second anti-rotation protrusions 82 are formed on an inner circumference of the coupling shoulder 80. When the upper coupling ring 90 is coupled to a lower side of the coupling shoulder 80, the first anti-rotation protrusions 92 are inserted between the second anti-rotation protrusions 82, respectively, so that the upper coupling ring 90 is prevented from spinning.

The cooling plate 60 is coupled between the discharge plate 50 and the upper coupling ring 90, and a gap between the cooling plate 60 and the upper coupling ring 90 is formed to be less than 0.05 mm. It is preferable to prevent a foreign material, the cosmetics remaining on the surface of the cooling plate 60, or the water used in cleaning the cooling plate 60 from leaking into the gap.

In addition, the upper coupling ring 90 is insert-injected or double-injected into the discharge plate 50 and the cooling plate 60, so that it is possible to completely prevent a gap from being formed between the cooling plate 60 and the upper coupling ring 90.

As shown in FIG. 5, the contamination guard plate 70 is coupled to the coupling groove 54 of the discharge plate 50, thereby covering most of the discharge hole 52 of the discharge plate 50 and the outlet 62 of the cooling plate 60. The discharge gap 72 for discharging the cosmetics to an outside is formed between the outer periphery of the contamination guard plate 70 and the outlet 62 of the cooling plate 60. The discharge gap 72 is connected to the discharge hole 52 of the discharge plate 50 and the outlet 62 of the cooling plate 60.

That is, a conventional pump-type compact container is formed with a plurality of outlets and has been used by discharging cosmetics to an outside through the plurality of outlets while pressing the discharge plate with a puff. However, when the discharge plate is repeatedly pressed, foreign substances stuck on the puff are easily introduced into each outlet so that cosmetics may be contaminated.

Thus, according to the compact container according to the present invention, the outlet 52 and the discharge hole 62 are formed in the centers of the discharge plate 50 and the cooling plate 60, respectively, and the contamination guard plate 70 is coupled to the center of the discharge plate 50, so that the contamination guard plate 70 may block most of the outlet 52 and the discharge hole 62 except for the discharge gap 72. Accordingly, when a user presses the cooling plate 60 with the puff, the discharge device 40 is pumped as the discharge plate 50 moves downwardly, so that the cosmetics pumped is discharged through the discharge gap 72 which is a gap in the form of a fine ring. Therefore, the compact container may be used more cleanly while preventing bacteria or contaminants from entering the discharge hole 62 from the puff.

The coupling protrusion 74 protrudes from a lower side of the contamination guard plate 70, and the coupling protrusion 74 passes through the discharge hole 62 of the cooling plate 60 and the coupling groove 54 of the discharge plate 54 to be fixedly coupled to the center of the piston 46 of the discharge device 40.

In addition, the contamination guard plate 70 may be formed of various materials such as a metal material or a synthetic resin material. The contamination guard plate 70 may be formed through coating (which is to improve the quality of the surface by covering the surface of the underlying material with a thin film such as metal or ceramic), plating (which is the coating of a thin layer of another material for the purpose of improving the surface condition of an article), or vapor evaporation (which is the coating of a thin layer of another material for the purpose of improving the surface condition of an object).

In addition, the contamination guard plate 70 may be formed by adding a silver nano material to have an antimicrobial activity. In detail, by forming the contamination guard plate 70 adjacent to the discharge gap 72 with silver nano material to have antibacterial power, the cosmetics remaining in the discharge gap 72 are sterilized by the contamination guard plate 70 to prevent the growth of bacteria in the cosmetics, thereby making it possible to cleanly use the cosmetics.

The width w of the discharge gap 72 is preferably 0.05 mm to 0.5 mm. That is, when the width 'w' of the discharge gap 72 is less than 0.05 mm, the width 'w' of the discharge gap 72 is too narrow so that the foundation particles of minerals contained in the cosmetics cannot come out through the discharge gap 72 to be accumulated, thereby causing a discharge error. When the width 'w' of the discharge gap 72 exceeds 0.5 mm, the width 'w' of the discharge gap 72 is too large so that foreign substances stuck on the puff are easily introduced through the discharge gap 72, thereby contaminating the cosmetics remaining in the discharge passage 56.

Figure 8:
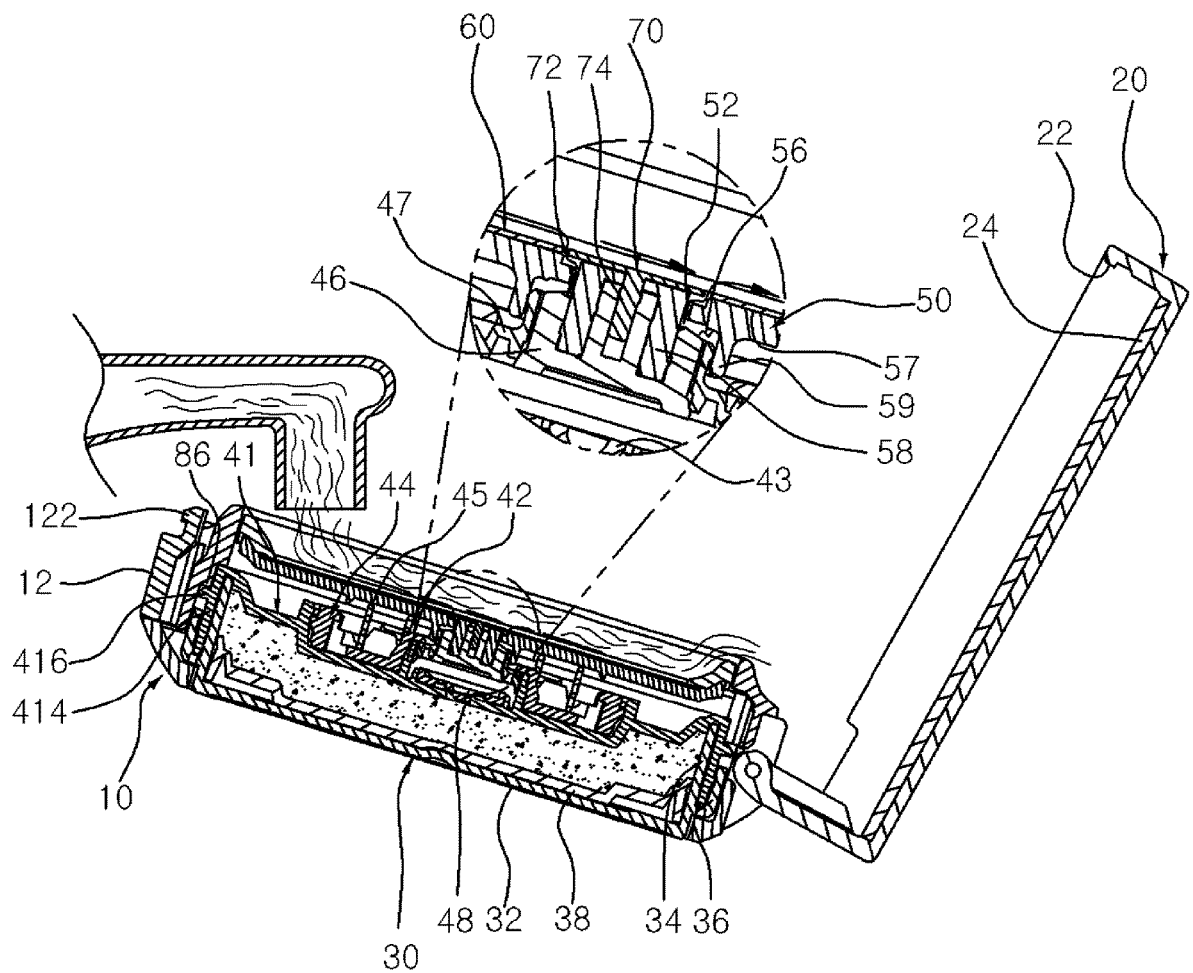
FIG. 8 is a cross-sectional view showing a state of washing a cooling plate of a compact container according to an embodiment of the present invention.

FIG. 8 is a cross-sectional view showing a state of washing a cooling plate of a compact container according to an embodiment of the present invention.

A compact container according to the present invention has an advantage of easily washing the above-described components.

That is, according to a conventional compact container, since the cosmetics must be stuck on a puff while pressing the discharge plate several times with the puff to discharge cosmetics, the contaminants stuck on the puff are left in the cosmetics make contact with the cosmetics remaining in the outlets, so that the cosmetics may be contaminated, and the cosmetics contaminated at the outlets contaminate the cosmetics in the diffusion space connected to lower portions of the outlets, thereby causing skin troubles. When the cosmetics are kept after use, the cosmetics remaining in the outlet are hardened so that the outlet is clogged. In addition, when the discharge plate gets dirty due to long term use is washed with water, water enters the diffusion space through the outlets, which causes the remaining cosmetics in the diffusion space to become thinner and unusable, or to decay and cause skin troubles.

To solve such a problem, according to the present invention, the contaminated cooling plate 60 may be washed with a cleaning liquid such as water and the discharge gap 72 and the discharge passage 56 may be washed together, so that the cooling plate 60 is always kept clean and the cosmetics are prevented from being contaminated. In detail, after the use of the cosmetic, as shown in FIG. 8, the compact container is obliquely tilted and then, the cooling plate 60 is washed by spraying water. In this case, water flows into the discharge passage 56 formed between the discharge device 40 and the discharge plate 50 through the upper portion of the tilted discharge gap 72. The water flowing into the discharge passage gap 72 flows along the outer circumference of the first lower extension protrusion wheel 58 of the discharge plate 50 to wash off the cosmetics remaining in the discharge passage 56, and then back to the lower portion of the tilted discharge gap 72, such that it is possible to prevent contamination of the discharge passage 56 and to prevent cosmetics from being hardened in the discharge passage 56.

Hereinafter, a method of assembling a compact container having a contamination-preventing cooling plate configured as described above will be described with reference to accompanying drawings.

To assemble the compact container according to the present invention, as shown in FIGS. 4 and 5, the content container 30 is inserted into the outer container 10 in which the outer container lid 20 is hinged to one side.

Next, the plate 38 is inserted into the content container 30, and after injecting cosmetics, the pump housing 41 of the discharge device 40 is coupled to the upper portion of the content container 30. The lower extension protrusion wheel 414 of the housing 41 is coupled while being inserted between the inner wall 34 and the outer wall 36 of the content container.

Next, the suction valve plate 43, the bushing 44, the elastic member 45, the piston 46, and the piston ring 47 are installed to the upper portion of the pump housing 41.

Next, prior to coupling the discharge plate 50 to the discharge device 40, the cooling plate 60 is seated on the cooling plate seating surface 57 of the discharge plate 50, and after the contamination guard plate 70 is coupled to the central upper portion of the discharge plate 50, the upper coupling ring 90 is coupled to the outer upper portions of the discharge plate 50 and the cooling plate 60. In addition, when the discharge plate 50, the cooling plate 60, and the upper coupling ring 90 are insert-injected or double-injected, the contamination guard plate 70 is coupled to the central upper portion of the discharge plate 50, and as it is, coupled to the upper portion of the means 40.

Next, as described above, the discharge plate coupled is coupled to the upper portion of the discharge device 40. The first lower extension protrusion wheel 58 of the discharge plate 50 is coupled to the piston 46, and the second lower extension protrusion wheel 59 is tightly close to the upper outside of the piston ring 47.

Last, the coupling shoulder 80 is inserted and coupled between the outer container 10 and the content container 30. The coupling protrusion 14 of the outer container 10 is coupled to the coupling groove of the coupling shoulder 80 and at the same time, the upper end of the fixing protrusion wheel 416 of the pump housing 41 is pressed and fixed by the pressing sill 86 of the coupling shoulder 80. In addition, the first anti-rotation protrusion 92 of the upper coupling ring 90 is inserted between the second anti-rotation protrusions 82 of the coupling shoulder 80, thereby completing the assembly of the compact container according to the present invention.

Hereinafter, a method of using a compact container having a contamination-preventing cooling plate assembled in the above-described manner will be described with reference to the accompanying drawings.

Figure 7:
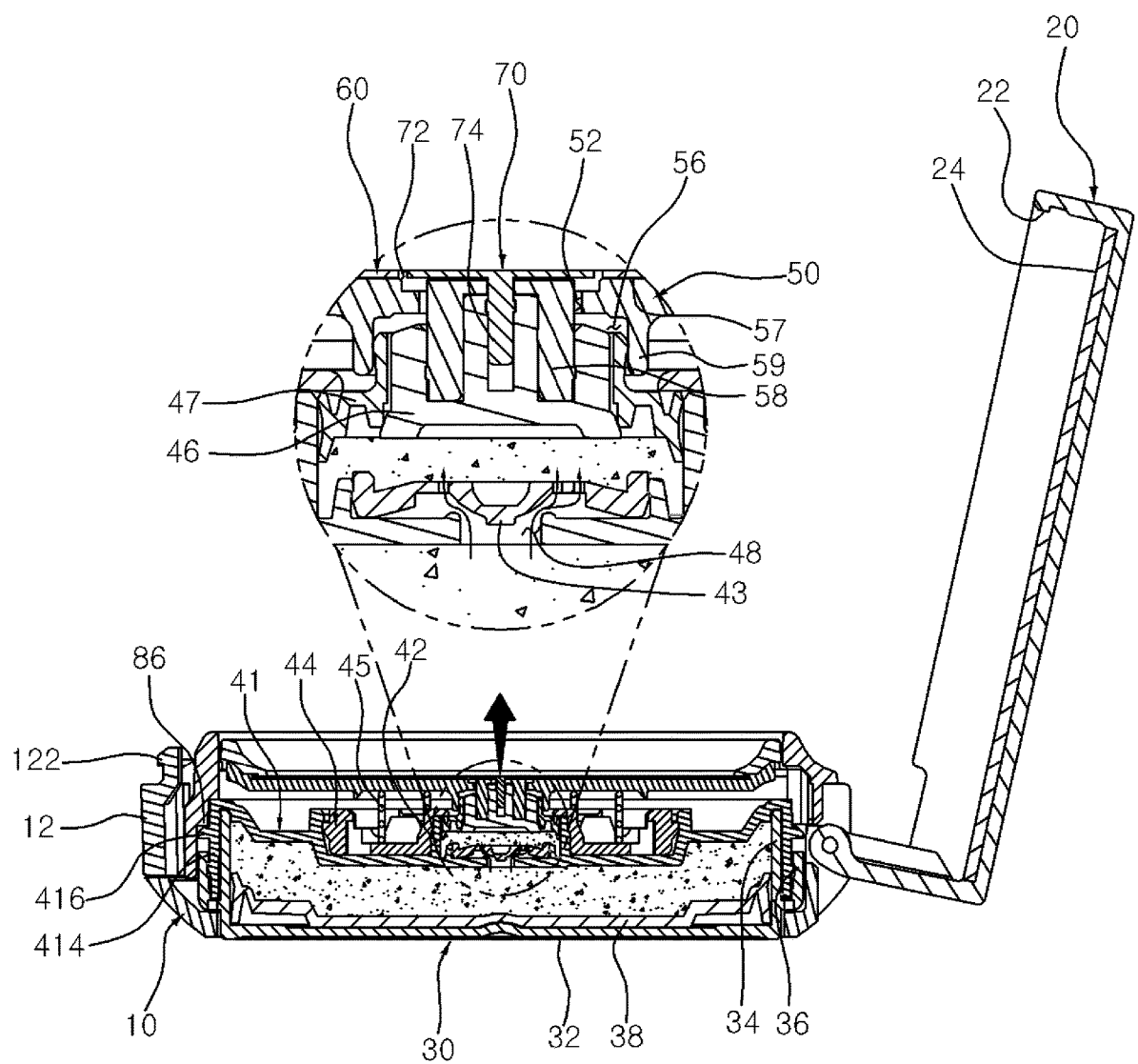
FIG. 7 is a view showing a state in which the cosmetics of the compact container according to an embodiment of the present invention flow into the cylinder of the discharge device.

FIG. 6 is a cross-sectional view showing a state in which the cosmetics of a compact container according to an embodiment of the present invention are discharged to an outside. FIG. 7 is a view showing a state in which the cosmetics of the compact container according to an embodiment of the present invention flow into the cylinder of the discharge device.

In order to use the compact container having a contamination-preventing cooling plate according to the present invention, the button 12 of the outer container 10 is first pressed to open the outer container lid 20.

Then, as shown in FIG. 6, the upper surface of the cooling plate 60 or the contamination guard plate 70 is pressed with a makeup tool such as puff. When the cooling plate 60 or the contamination guard plate 70 is pressed, the discharge plate 50 coupled to the lower portion of the cooling plate 60 or the contamination guard plate 70 is also moved downward, and at the same time, the piston 46 and the piston ring 47 coupled to the lower side of the discharge plate 50 also move downward together, thereby reducing the volume inside the cylinder 42.

Accordingly, a pressure is generated in the cylinder 42, and as the cosmetics in the cylinder 42 are discharged to an outside due to the pressure, a discharge pressure is generated, so that the suction valve plate 43 blocks the content suction hole 48 formed in the bottom surface of the cylinder 42.

At the same time, as shown in the enlarged view of FIG. 6, the cosmetics contained in the cylinder 42 are discharged between the piston 46 and the piston ring 47, and after passing through the discharge passage 56 formed between the discharge device 40 and the discharge plate 50, the cosmetics pass through the outlet 52 of the discharge plate 50 and are discharged into the discharge gap 72 of the contamination guard plate 70.

Thereafter, as shown in FIG. 7, when the pressure on the cooling plate 60 or the contamination guard plate 70 is released, the discharge plate 50 moves upwardly by the elasticity of the elastic member 45 that elastically supports the discharge plate 50. As the piston 46 coupled to the lower side of the discharge plate 50 and the piston ring 47 are also moved upward together, the inner volume of the cylinder 42 is increased so that the vacuum pressure is generated.

At the same time, the suction valve plate 43 is lifted by the vacuum pressure generated inside the cylinder 42, and the content suction hole 48 formed in the bottom surface of the cylinder 42 is opened. Thus, the contents contained in the content container 30 flows into the cylinder 42 through the content suction hole 48, and at the same time, the pressing plate 38 installed inside the content container 30 moves upward by the amount of discharged cosmetics.

As described above, the compact container having a contamination-preventing cooling plate described in this disclosure is an illustrative purpose only, and the present invention is not limited thereto. Thus, it should be understood that numerous other modifications and embodiments can be devised by those skilled in the art within the spirit and scope of the present invention and they will fall within the scope of the present invention.

DESCRIPTION OF REFERENCE NUMERAL

10: Outer container
20: Outer container lid
30: Inner container
40: Discharge device
50: Discharge plate
52: Outlet
54: Coupling groove
56: Discharge passage
60: Cooling plate
62: Discharge hole
70: Contamination guard plate
72: Discharge gap
74: Coupling protrusion
80: Coupling shoulder
90: Upper coupling ring
w: Width of discharge gap

The invention claimed is:

1. A compact container having a cooling plate, the compact container comprising:
   a discharge device for discharging cosmetics;
   a discharge plate coupled to the discharge device and formed with a discharge hole and a coupling groove at a center thereof; and
   the cooling plate coupled to the discharge plate and formed with an outlet at a center thereof and formed of a metal material,
   wherein a contamination guard plate is coupled into the coupling groove of the discharge plate to form a discharge gap for discharging the cosmetics to an outside between an outer periphery of the contamination guard plate and an outlet of the cooling plate,
   wherein the contamination guard plate blocks most of the outlet and the discharge hole except for the discharge gap,
   wherein the cosmetics is discharged through the discharge gap,
   wherein the discharge gap is annular.

2. The compact container of claim 1, wherein the discharge device includes a pump for discharging the cosmetics through pumping.

3. The compact container of claim 1, wherein a discharge passage through which the cosmetics pass is formed between the discharge plate and the discharge device.

4. The compact container of claim 1, wherein, when wash liquid is sprayed to wash the cooling plate after obliquely tilting the compact container, the wash liquid flows into a discharge passage through an upper portion of the discharge gap when the container is in a tilted position, and the wash liquid flowing along the discharge passage washes the cosmetics remaining in the discharge passage and is discharged back to a low portion of the discharge gap when the container is in the tilted position.

5. The compact container of claim 1, wherein an upper coupling ring is further coupled to upper portions of the discharge plate and the cooling plate.

6. The compact container of claim 5, wherein the cooling plate is coupled between the discharge plate and the upper coupling ring, and a gap between the cooling plate and the upper coupling ring is no greater than 0.05 mm.

7. The compact container of claim 1, wherein an upper coupling ring is formed at upper portions of the discharge plate and the cooling plate through insert-injection molding or double-injection molding.

8. The compact container of claim 1, wherein a coupling protrusion is formed below the contamination guard plate, and the coupling protrusion passes through the coupling groove of the discharge plate and is fixedly coupled to the discharge device.

9. The compact container of claim 1, wherein the contamination guard plate is formed of a metal material or synthetic resin material.

10. The compact container of claim 1, wherein the contamination guard plate is formed through coating, plating or vapor deposition.

11. The compact container of claim 1, wherein a width of the discharge gap is 0.05 mm to 0.5 mm.

* * * * *